March 29, 1966     C. DE SCRANAGE     3,243,183
ARTIFICIAL SNOW-MAKING MACHINE
Filed Dec. 9, 1963
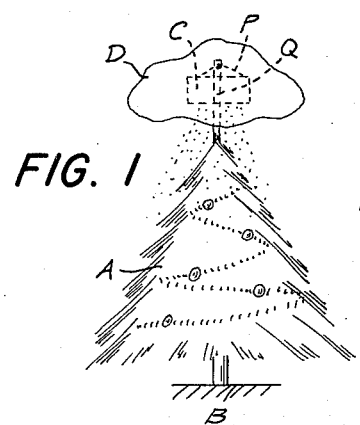
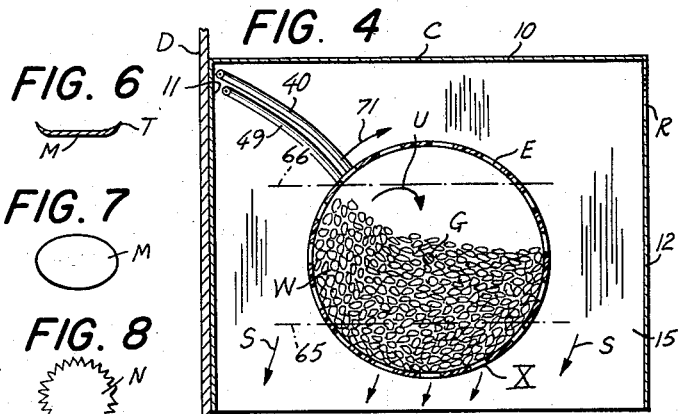
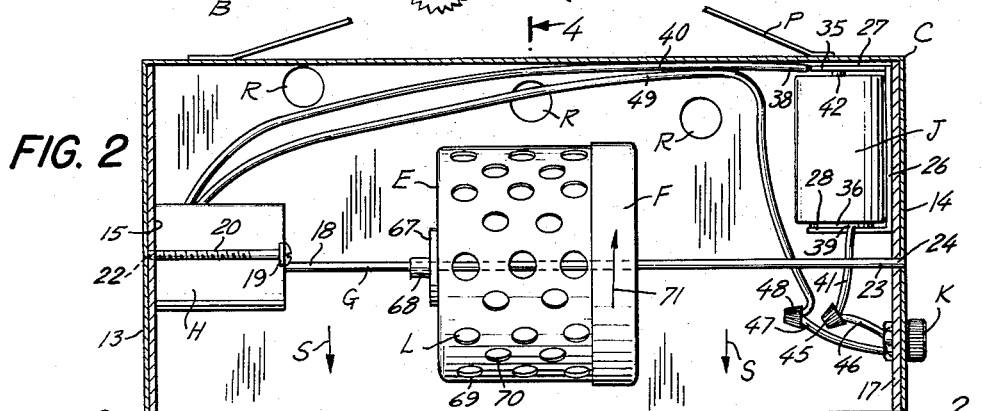
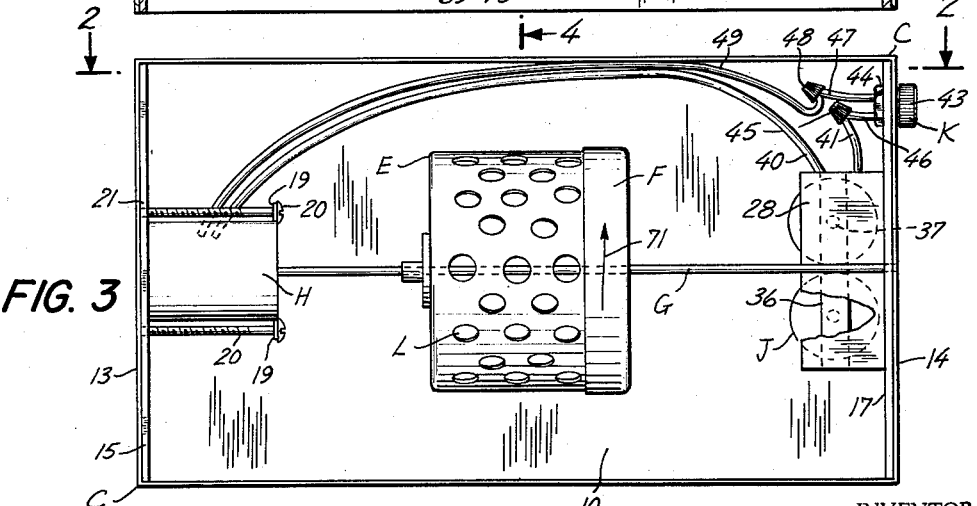
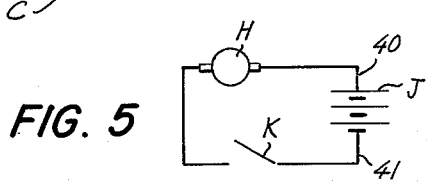
INVENTOR.
CANDIRUS DE SCRANAGE
BY
ATTORNEY

United States Patent Office 3,243,183
Patented Mar. 29, 1966

3,243,183
ARTIFICIAL SNOW-MAKING MACHINE
Candirus De Scranage, 219 W. 80th St., New York, N.Y.
Filed Dec. 9, 1963, Ser. No. 328,827
9 Claims. (Cl. 272—8)

The present invention relates to an artifical snow-making machine and it particularly relates to a machine that can be used in connection with Christmas displays.

It is among the objects of the present invention to make an artifical snow-making machine which will be simple in operation and light in which and which may be readily used in and around the household and which will give the appearance of the falling of snow.

Another object is to provide a small light-weight, readily mountable snow production device which will permit generation of artifical snow in and around Christmas trees and in connection with interior decorations.

Still further objects and advantages will appear in the more detailed description set forth below, it being understood, however, that this more detailed description is given by way of illustration and explanation only and not by way of limitation, since various changes therein may be made by those skilled in the art without departing from the scope and spirit of the present invention.

In accomplishing the above objects according to one embodiment of the present invention there is provided a plastic light-weight cylinder having a series of spaced openings in the side thereof extending around the entire periphery thereof, through which, under slight pressures, slightly curved disks of plastic paper or laminated material may be gradually dispensed, desirably in horizontal position, so as to flutter downwardly slowly, preferably with a swirling or side-slipping motion.

This perforated cylinder should be capable of being filled at intervals by means of a cover or suitable filler opening which may be covered when the device is in operation.

Desirably, the box contains a small electric motor at one side thereof with a switch at the other side with a shaft extending through the box and assuring a slow rotation of the cylinder in the box when the switch is actuated.

The shaft may be of irregular or square cross-section so as to cause rotation of the container, or suitable connection may be made to the shaft and the ends of the box to achieve rotation of the dispensing or holed cylinder with the shaft.

Desirably, the box is of square or rectangular shape covered on its top and sides and open on its bottom, and the side of the box may be provided with one or more openings to permit the entrance of air adjacent the top of the box, which will permit the air to flow down with the small disks as they create a downward draft of air.

Desirably, these openings are provided at each side of the box and above the dispensing cylinder and the current of air created will assure a downward flow.

It has been found that two flashlight batteries are most satisfactory for giving the necessary current, and by means of a switch or rheostat it is possible to regulate the speed at which the cylinder will be rotated.

Desirably, the rotation is such as to eliminate any centrifugal effect, but at all times the cylinder should be kept between ¼ and ¾ full so that there will be sufficient weight to cause the disks to fall through the openings in the preferred arrangement of providing a cylinder of a light-weight thin sheet plastic, such as cellulose acetate or some other thermoplastic sheet material. With the disk consisting of a resin impregnated or laminated paper, there will be sufficient adherence between the snow flakes or disks so that they will tumble within the cylinder and will be slowly released with a side-slipping motion most closely to simulate snow flakes.

Desirably, by using a round shape which is dished and which has a diameter of about ¼ to ½ inch with a preferred dimension of ⅜ of an inch, and using about a weight between 5 to 10 ounces of these artificial snow flake disks in a cylinder of 4 to 8 inches in diameter and 6 to 18 inches long, with holes therein of about ⅜ of an inch spaced apart on centers between ¾ to 1 inch, a most satisfactory artificial snow flake is achieved.

Although the dispensing container may also take the form of a rotating box of rectangular shape and size, it has been found that a cylinder will give the most uniform dispensation of the snow.

The artifical snow flakes at all times should not only create a downward air current but should resist gravity so that they will fall slowly and tend to slide or slip from side to said as they descend.

By causing them to have a bowed shape and a slightly larger diameter than the holes in the cylinder, they will be slowly released from the holes at the bottom of the cylinder without substantial release from the sides or other portions of the cylinder.

The rate of rotation is desirably so regulated that the dispensing cylinder, with its perforations or openings in the side thereof, will rotate about once every 10 to 20 seconds and thus give the desired rate of fall.

With the foregoing and other objects in view, the invention consists of the novel construction, combination and arrangement of parts as hereinafter more specifically described, and illustrated in the accompanying drawings, wherein is shown an embodiment of the invention, but it is to be understood that changes, variations and modifications can be restored to which fall within the scope of the claims hereunto appended.

In the drawings wherein like reference characters denote corresponding parts throughout the several views.

FIG. 1 is a side elevational view showing the snow dispensing device of the present invention in position upon the top of a Christmas tree.

FIG. 2 is a vertical transverse sectional view taken upon the line 2—2 of FIG. 3 showing the cylinder in side view with the air inlet openings associated therewith.

FIG. 3 is a bottom view taken from the open bottom of the box showing the dispensing cylinder in position therein.

FIG. 4 is a vertical transverse sectional view taken upon the line 4—4 of FIG. 2.

FIG. 5 is a diagrammatic wiring diagram showing the manner in which the electrical connections may be made.

FIG. 6 is a transverse sectional view of a typical snow disk.

FIG. 7 is a top plan view of the form of the snow flake of FIG. 6.

FIG. 8 is a top plan view of the alternative form of snow flake.

Referring to FIGS. 1 to 5, there is shown a Christmas tree A supported suitably in the ground or upon the floor, as indicated at B, and carrying at the top thereof by suitable attachment or suspension means an open bottom container C covered by an artificial cloud D.

As shown in FIGS. 2 to 4, the dispensing device consists of the container or box C having a central cylindrical dispenser E with a removable, friction fit telescoping cover F, a shaft G, a small, geared down, lightweight motor H, and 2 replaceable flashlight batteries J.

These flashlight batteries may be connected to turn on the motor H by means of a switch or rheostat K which can also regulate the speed. Desirably, 2 or 3 flashlight batteries are employed.

These batteries are readily replaceable when used and will generate enough electrical energy to rotate the cylinder E for a period of 3 to 5 hours.

An important feature of the present invention resides in the positioning of circular openings L in the side of the cylinder E which are just slightly smaller in size than the pliable round dished paper flakes M having circular edges or N having serrated edges.

The box may be suspended by means of a strap P or other hanger from an extension Q from the top of the tree, as shown in FIG. 1, or it may be otherwise mounted in position.

The openings R at one side of the inverted box positioned above the cylinder E and in the direction in which the dispensing cylinder E turns will permit a downward current of air to be generated, as indicated at S, which will assure a slow fall of the flakes, with a slipping motion.

The material E should be of a light-weight, transparent plastic sheet material, of about .001 to .003 of an inch, and desirably at the maximum of about .005 to .01 of an inch, and it should be relatively flexible and about ½ the thickness of the dished snow flake elements M and N, which may have a thickness of about .005 to .02 inch, with the edges of the round disks being turned or dished upwardly so as to have a slight resistance to movement out of the dispensing openings L in view of their slightly larger diameter, with the result that the tumbling action indicated by the arrow U in FIG. 4 and the weight of the mass of disks, as indicated by W in FIG. 4, will result in a slow release from the bottom-most row of openings indicated at X in FIG. 4 as the cylinder E slowly rotates once every 10 to 20 seconds.

As a result, when the cylinder E is filled to between ¾ to ¼ capacity, the dispensation of flakes will take place at such a slow regular rate as to permit operation without refilling for a period of 2 to 4 hours.

Referring specifically to FIGS. 2 to 4, the box has a top wall 10, the front wall 11 carrying the artificial cloud plaque D, which will also stiffen the same, and a rear wall 12 which desirably is provided with the air inlet openings R to permit generation of a slow downward current of air S.

The short side walls 13 and 14 will be provided with interior stiffening boards or plaques 15 and 17, which will both stiffen the structure of the box and also form a sufficiently rigid supporting connection for the motor H, the batteries J and the switch K.

Referring to the shaft G, the shaft G will be connected to the motor H at one end 18 and this motor may be in turn mounted by the side ears 19 and the bolts 20 in threaded openings in the central portion 21 of the end stiffening board 15 inside of the cover 13.

These side bolts 20 may be screwed directly into the heavy reenforcing board 15 as indicated at 22. The other end 23 of the shaft G, which may extend entirely through the dispensing cylinder E, will have a bearing at 24 and an opening in the central portion of the reenforcing board 17, or it may be permitted to project through the wall 14 and the board 17.

Both reenforcing boards 15 and 17 may be of heavy fiber board about twice the thickness of the end walls 13 and 14.

The batteries are desirably mounted in a plastic U-shaped frame having a base 26 and top and bottom flanges 27 and 28.

These flanges are desirably resilient so that they will be forced slightly apart by the two batteries and they may carry metal strips by rivets.

These flanges 27 and 28 may carry the copper strips 35 and 36, held in position by means of rivets such as indicated at 37 in FIG. 3, to which will be connected the ends 38 and 39 of the conductor or electrical wiring 40 and 41.

As shown, the strip 36 will contact the base or zinc casing of the battery, whereas the tip or carbon 42 will contact the top strip 35.

These strips may be provided with suitable recesses or notches to firmly contact the top and bottom of the two flashlight batteries J and they may be readily removed by pressing down on the resilient portion 28 of the U-shaped support structure.

As shown in FIGS. 2 and 3, the switch K has a knurled handle member 43 and may be either an on and off switch or an actuating rheostat and which is held in position by means of the nut 44 on the inside of the fiber board support panel 17.

The wires 40 and 41, as shown in FIG. 5, may form part of the circuitry and the wire 40 extends directly to the motor H, while the wire 41 is connected by a junction 45 to a wire 46 leading to the switch 43.

The other side of the switch is connected by the wire 47 and the junction 48 to the wire 49, also leading to the motor H.

These wires are of such stiffness that they may be bent into position against the wall 12 or the top 10 of the box C and not interfere with the rotation or operation of the cylinder E.

The shaft G will pass through the cylinder and the cover F, with the cover F being slidable upon the shaft G so that the box may be turned with the container portion E down and permit filling of the dispensing cylinder E with the artificial snow flakes W, so that it will be between ¾ to ⅔ filled initially.

Desirably, it is filled before the snow flakes fall to ¼ level, as indicated by the dot and dash line 65. At the same time it should not be filled above the dot and dash line 66. (See FIG. 4.)

This will give the desired pressure and tumbling effect U upon the disks M and N and cause the rate of dispensation of the snow flakes that may be desired.

The shaft G may be of square cross-section so as to turn the cylinder E, but preferably there is provided an adhesive or plastic disk 67 having a sleeve 68 which is mounted on the rod G, either by adhesion or fusion, so as to assure that the cylinder E will turn with the shaft G.

It will be noted that there are successive rows of three holes, as indicated at 69, and two holes, as indicated at 70.

It will be noted that the direction of rotation 71 is toward the back of the box and toward the openings R, so that the flakes will be given a slight forward momentum, as indicated by the arrows X, and create a draft of air, as indicated by the arrows S, slightly downwardly and toward the cloud facing D.

This will result in the flakes falling slightly forwardly toward the cloud, creating an air current which will be directed toward the side 11 of the box C.

Although many variations may be made, with the particular arrangement shown a most effective artificial snowfall is achieved, while at the same time the curved shape of the disks M will enable them readily to be gathered up and the friction in the plastic material will cause them to have a slight electro-static charge which will cause them to separate and slightly repel each other as they are released and as they fall. This will separate the flakes as they fall and will prevent clumping or adherence.

At the same time they may be readiy gathered up after they have been deposited and disposed of.

As many changes could be made in the above artificial snow-making machine, and many widely different embodiments of this invention could be made without departure from the scope of the claims, it is intended that all matter contained in the above description shall be interpreted as illustrative and not in a limiting sense.

Having now particularly described and ascertained the nature of the invention, and in what manner the same is to be performed, what is claimed is:

1. A method of dispensing artificial snow flakes which comprises tumbling dished, relatively stiff but flexible paper disks in a rotating cylinder of a thin transparent plastic sheet having dispensing openings in the sides thereof, just sufficient to permit passage of the disks therethrough with slight friction.

2. A method of dispensing artificial snow flakes which comprises tumbling dished, relatively stiff but flexible paper disks in a rotating cylinder of a thin transparent plastic sheet having dispensing openings in the sides thereof, just sufficient to permit passage of the disks therethrough with slight friction, said disks being dished so that they will tend to fall with their convex faces downwardly and said tumbling causing generation of a static electric charge which will separate the disks upon release.

3. A method of dispensing artificial snow flakes which comprises tumbling dished, relatively stiff but flexible paper disks in a rotating cylinder of a thin transparent plastic sheet having dispensing openings in the sides thereof, just sufficient to permit passage of the disks therethrough with slight friction, said cylinder having a length of about 6 to 18 inches, a diameter of about 4 to 8 inches, and turning at a rate of once every 10 to 20 seconds and having a series of rows of 2 and 3 holes spaced between ½ inch to 1 inch on centers and with the successive rows separated from each other by a space of ½ to 1 inch and with the disks having a slightly larger diameter than the openings by about 1/64 to 1/128 of an inch.

4. A method of dispensing artificial snow flakes which comprises tumbling dished, relatively stiff but flexible paper disks in a rotating cylinder of a thin transparent plastic sheet having dispensing openings in the sides thereof, just sufficient to permit passage of the disks therethrough with slight friction, maintaining said cylinder at least between ¼ to ¾ full of said disks, which are tumbled together in close contact with the plastic wall.

5. An artificial snow dispensing apparatus comprising an inverted container of rectangular shape, having top, side and end walls, a motor mounted on one end wall, a shaft extending between said end walls and connected to the motor at one end and having a bearing in the end wall at the other shaft end, and a switch and electric source mounted on the opposite end wall and a holed cylinder intermediately mounted on said shaft to turn with said shaft and including a removable telescoping cover and a plurality of flexible dished disks of artificial snow in said cylinder having an outside diameter slightly larger than the diameter of the holes in said cylinder.

6. An artificial snow dispensing apparatus comprising an inverted container of rectangular shape, having top, side and end walls, a motor mounted on one end wall, a shaft extending between said end walls and connected to the motor at one end and having a bearing in the end wall at the other shaft end, and a switch and electric source mounted on the opposite end wall and a holed cylinder intermediately mounted on said shaft to turn with said shaft and including a removable telescoping cover and a plurality of flexible dished disks of artificial snow in said cylinder having an outside diameter slightly larger than the diameter of the holes in said cylinder, said cylinder being formed of a thin sheet flexible plastic material thinner than said disks and generating a static charge when said disks are tumbled therein.

7. An artificial snow dispensing apparatus comprising an inverted container of rectangular shape, having top, side and end walls, a motor mounted on one end wall, a shaft extending between said end walls and connected to the motor at one end and having a bearing in the end wall at the other shaft end, and a switch and electric source mounted on the opposite end wall and a holed cylinder intermediately mounted on said shaft to turn with said shaft and including a removable telescoping cover and a plurality of flexible dished disks of artificial snow in said cylinder having an outside diameter slightly larger than the diameter of the holes in said cylinder, said cylinder being mounted to turn with said shaft and said cover being slidable on said shaft and being frictionally held on the cylinder when covering the same.

8. An artificial snow dispensing apparatus comprising an inverted container of rectangular shape, having top, side and end walls, a motor mounted on one end wall, a shaft extending between said end walls and connected to the motor at one end and having a bearing in the end wall at the other shaft end, and a switch and electric source mounted on the opposite end wall and a holed cylinder intermediately mounted on said shaft to turn with said shaft and including a removable telescoping cover and a plurality of flexible dished disks of artificial snow in said cylinder having an outside diameter slightly larger than the diameter of the holes in said cylinder, said end walls being stiffened with internal fiber board elements so as to hold said container rigid and prevent vibration of the cylinder as it rotates.

9. An artificial snow dispensing apparatus comprising an inverted container of rectangular shape, having top, side and end walls, a motor mounted on one end wall, a shaft extending between said end walls and connected to the motor at one end and having a bearing in the end wall at the other shaft end, and a switch and electric source mounted on the opposite end wall and a holed cylinder intermediately mounted on said shaft to turn with said shaft and including a removable telescoping cover and a plurality of flexible dished disks of artificial snow in said cylinder having an outside diameter slightly larger than the diameter of the holes in said cylinder, said electric source comprising batteries, said batteries being held by a U-shaped plastic clip.

References Cited by the Examiner

UNITED STATES PATENTS

| 635,043 | 10/1899 | Grismer | 272—15 |
| 901,319 | 10/1908 | Bruen | 272—15 |

FOREIGN PATENTS 2,500 of 1908 Great Britain.

RAPHAEL M. LUPO, *Primary Examiner.*

KENNETH N. LEIMER, *Examiner.*